(12) United States Patent
Tadokoro et al.

(10) Patent No.: US 8,842,797 B2
(45) Date of Patent: Sep. 23, 2014

(54) GAMMA SCANNING APPARATUS

(75) Inventors: Takahiro Tadokoro, Hitachi (JP); Hiroshi Kitaguchi, Naka (JP); Katsunori Ueno, Hitachi (JP); Yutaka Iwata, Hitachi (JP); Ryusuke Kimura, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 424 days.

(21) Appl. No.: 13/304,775

(22) Filed: Nov. 28, 2011

(65) Prior Publication Data

US 2012/0134459 A1    May 31, 2012

(30) Foreign Application Priority Data

Nov. 29, 2010 (JP) ................. 2010-265011

(51) Int. Cl.
  *G21C 17/00*  (2006.01)
  *G21C 17/06*  (2006.01)
(52) U.S. Cl.
  CPC .................. *G21C 17/063* (2013.01)
  USPC ....................................................... 376/257
(58) Field of Classification Search
  USPC ....................................................... 376/257
  See application file for complete search history.

(56) References Cited

U.S. PATENT DOCUMENTS 3,717,765 A * 2/1973 Hiller ........................ 250/370.03
6,596,998 B1 * 7/2003 Siedel ........................ 250/370.1

FOREIGN PATENT DOCUMENTS

| JP | 57201893 A | * | 12/1982 |
| JP | UM 61-97594 | | 5/1986 |
| JP | 63142286 A | * | 6/1988 |
| JP | 04-115193 | | 4/1992 |
| JP | 10-332873 | | 12/1998 |
| JP | 2001-235546 | | 8/2001 |

OTHER PUBLICATIONS

Office action in corresponding Japanese Appln. No. 2010-265011, mailed Aug. 27, 2013.

* cited by examiner

*Primary Examiner* — Timothy A Brainard
(74) *Attorney, Agent, or Firm* — Antonelli, Terry, Stout & Kraus, LLP.

(57) ABSTRACT

A gamma scanning apparatus includes a moving and fixing mechanism which moves/fixes a housing to a definite position, and a rotating and moving mechanism which moves a fuel assembly vertically in addition to rotating the assembly. A gamma-ray counting circuit measures an output of a gamma-ray detector, and a data collecting/analyzing and controlling apparatus analyzes data output from the gamma-ray counting circuit, in association with data relating to the rotation and movement of the fuel assembly by the rotating and moving mechanism. The rotating and moving mechanism, after fixing the vertical position of the fuel assembly with the housing also fixed, rotates the fuel assembly through 360° with its height kept constant, and during the 360° rotation of the fuel assembly, the gamma-ray counting circuit measures either a time average of count values of the detector during the rotation or an integral value within a fixed time.

9 Claims, 6 Drawing Sheets

Initial Position

FIG. 4A

Vertical Movement

FIG. 4B

Longitudinal Movement

GAMMA SCANNING APPARATUS

BACKGROUND OF THE INVENTION

1. Field of the Invention

The present invention relates generally to gamma scanning apparatus that measures radiation emitted from a fuel assembly at a nuclear power plant and thus measures burn-up and a power distribution of the fuel assembly. More particularly, the invention is directed to gamma scanning apparatus suitable for measuring burn-up and a power distribution of a fuel assembly accurately, not depend on the accuracy of an installation location and installation angle of the fuel assembly, and hence for measuring radiation emissions from a number of fuel assemblies within a short time.

2. Description of the Related Art

It is traditionally known that gamma rays are used to measure the burn-up of a spent fuel assembly, as in JP-10-332873-A.

A method of measuring burn-up and a power distribution by measuring the radiation from an active fuel assembly at a nuclear power plant is also coming into use in recent years. In these measurements, a housing is fixedly installed to obtain a constant relative angle between the housing and an outer surface of the fuel assembly having a square cross section, and the fuel assembly is moved vertically with the relative angle kept constant. In this case, a collimator is provided on a radiation detector present inside the housing, and a central portion of the height section of the fuel assembly that is included in a solid angle defined by the collimator is identified as a vertical central position. The measurement of the vertical burn-up and power distribution of the fuel assembly is conducted by repeating several steps. First, the fuel assembly is moved vertically and fixed to a given position. Next, a first measuring operation is performed and then the fuel assembly is moved vertically once again. After this, the fuel assembly is fixed again and a second measuring operation follows. For measurement at a relative angle between at least two positions, the burn-up and the power distribution have traditionally been measured in a vertical direction with the angle kept constant, then this angle has been changed and the fuel assembly fixed, and the angle has been kept constant once again and the fuel assembly moved vertically again for measurement. In addition, referring to measuring angles, if the angle at which one side of the square of the fuel assembly having the square cross section faces the detector is defined as 0 degrees, for example, measurements have been conducted at an angle of 45 degrees and the angle of 225 degrees established by rotating the fuel assembly through 180 degrees from the state of 45 degrees.

Given a constant gamma-ray intensity distribution in the fuel assembly, if the relative angle between the fuel assembly and the housing changes, the self-shielding effect of the fuel assembly and other factors change a counting rate of the radiation detector within the housing. Before starting the measurements, therefore, it has been necessary to accurately determine an axial rotational position of the fuel assembly with respect to the housing.

SUMMARY OF THE INVENTION

However, since the fuel rods in the fuel assembly usually have some minor bends or shifts in horizontal position, even if the rotational position of the fuel assembly is accurately determined prior to the measurements, errors occur with the distribution measurement during the vertical movement of the fuel assembly.

One conceivable solution to this problem would be by using two gamma-ray detectors as one pair, arranging the two detectors to include a central axis of the fuel assembly and to be left-right symmetrical with respect to the central axis, and combining detection signals of these detectors prior to inspection. This solution, however, causes measurement errors associated with errors relating to the layout of the two detectors at the above positions. Additionally, that has been a problem in that the necessity of using the two detectors to perform the measurement at one vertical position involves the use of large-size apparatus including a collimator, and makes the apparatus expensive.

An object of the present invention is to provide gamma scanning apparatus that can accurately measure burn-up and a power distribution of a fuel assembly not depend on the accuracy of an installation angle of the fuel assembly, and can thus measure radiation emissions from a number of fuel assemblies accurately within a short time.

(1) In order to achieve the above object, the present invention is the gamma scanning apparatus according to includes a gamma-ray detector, a collimator that limits a measuring range in a fuel assembly and limits entry of gamma rays from the fuel assembly into the gamma-ray detector, an absorber that controls intensity of the gamma rays entering the gamma-ray detector, a shield that shields the gamma-ray detector, a housing that contains the gamma-ray detector, the collimator, the absorber, and the shield, and moving and fixing means that moves the housing to a definite position and fixing the housing thereto. The gamma scanning apparatus further includes rotating and moving means that moves the fuel assembly vertically in addition to rotating the assembly, a gamma-ray counting circuit that measures an output (power) of the gamma-ray detector, and data collecting/analyzing and controlling apparatus that analyzes data output from the gamma-ray counting circuit, in association with data relating to the rotation and movement of the fuel assembly by the rotating and moving means. The rotating and moving means, after fixing the vertical position of the fuel assembly with that of the housing also fixed, rotates the fuel assembly through 360 degrees with its height kept constant, at a fixed or variable angular velocity. During the 360-degree rotation of the fuel assembly, the gamma-ray counting circuit measures either a time average of any count values which the gamma-ray detector has detected during the rotation of the fuel assembly (i.e., an average counting rate), or an integral value of any counts detected within a fixed time by the detector. The data collecting/analyzing and controlling apparatus analyzes the data output from the gamma-ray counting circuit, in association with the data relating to the rotation and movement of the fuel assembly by the rotating and moving means, and thus derives a burn-up distribution and power distribution of the fuel assembly.

This configuration allows the gamma scanning apparatus to accurately measure the burn-up and power distribution of the fuel assembly not depend on the accuracy of an installation angle of the fuel assembly, and hence to accurately measure radiation emissions from a number of fuel assemblies within a short time.

(2) In item (1) described above, after the housing has been fixed, the rotating and moving means preferably conducts the rotation and vertical movement of the fuel assembly at the same time, and during 360-degree rotation, moves the fuel assembly vertically to an appropriate position according to desired measuring height. During this time, the gamma-ray counting circuit preferably measures either the time average of the count values which have been detected during the rotation and vertical movement of the fuel assembly (i.e., the average counting rate), or the integral value of the counts detected within a fixed time by the detector, and thus derives the burn-up and power distribution of the fuel assembly.

(3) In item (1), after the housing has been fixed, the rotating and moving means preferably conducts the rotation and vertical movement of the fuel assembly at the same time, and during 180-degree rotation, moves the fuel assembly vertically to an appropriate position according to desired measuring height. During this time, the gamma-ray counting circuit preferably measures either a time average of any count values which have been detected during the rotation and vertical movement of the fuel assembly (i.e., an average counting rate), or an integral value of any counts detected within a fixed time by the detector, and thus derives a burn-up and power distribution of the fuel assembly.

(4) In item (1), the gamma-ray detector is preferably disposed in plurality in a vertical direction and the detectors are installed at desired measuring height in the vertical direction or at an integral multiple of the desired measuring height.

(5) In item (1), during the rotation and vertical movement of the fuel assembly, the data collecting/analyzing and controlling apparatus preferably collects, at the same time, data on rotational and vertical positions of the fuel assembly existing at the moving time of day, and data on counting rates of the gamma-ray detector existing at the particular time.

(6) In item (1), the burn-up or power distribution of the fuel assembly is preferably derived by using an average counting rate with respect to a burn-up index nuclide or power index nuclide or using an integral value of any count values detected within a fixed time.

(7) In item (1), a germanium semiconductor detector or an LaBr3(Ce) scintillation detector is preferably used as the gamma-ray detector.

(8) In item (1), preferably, the gamma scanning apparatus further includes collimator driving means that drives a collimator, the collimator being disposed in the gamma scanning apparatus, so as to make height of the collimator variable and to render a distance between the fuel assembly and the detector variable, wherein the collimator driving means makes variable a solid angle at which the fuel assembly is viewed from the detector.

(9) In item (1), the shield preferably includes a metal, such as iron or stainless steel, that is placed around the gamma-ray detector in order to shield against characteristic X-rays generated when a heavy metal is irradiated with the gamma rays.

Effect of the Invention

In the present invention, the burn-up and power distribution of the fuel assembly is accurately measured not depend on the accuracy of the installation angle of the fuel assembly, and hence, radiation from a number of fuel assemblies is measured within a short time.

DESCRIPTION OF THE PREFERRED EMBODIMENTS

Hereunder, a configuration and operation of gamma scanning apparatus according to an embodiment of the present invention will be described with reference to FIGS. 1 to 5.

An overall configuration of the gamma scanning apparatus according to the present embodiment is first described below with reference to FIG. 1.

Figure 1:
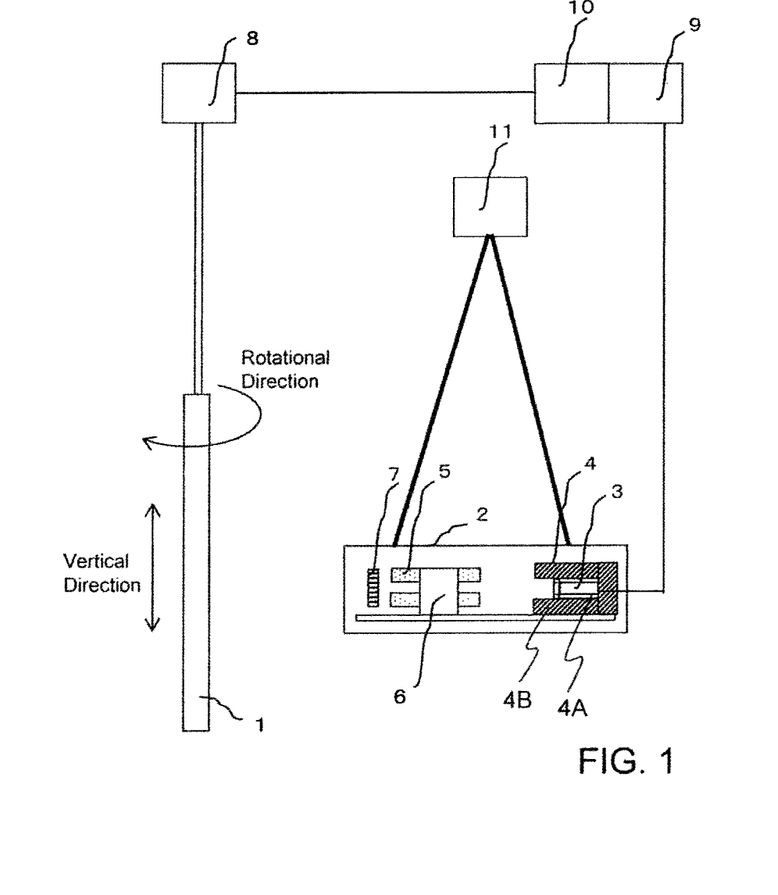
FIG. 1 is a block diagram showing an overall configuration of gamma scanning apparatus according to an embodiment of the present invention.

FIG. 1 is a block diagram showing the overall configuration of the gamma scanning apparatus according to the present embodiment.

The gamma scanning apparatus of the present embodiment includes a housing 2, a gamma-ray detector 3, a shield 4, a collimator 5, a collimator driving unit 6, an absorber 7, a fuel assembly moving and rotating unit 8, a gamma-ray counting circuit 9, data collecting/analyzing and controlling apparatus 10, and a moving and fixing mechanism 11. The gamma-ray detector 3, the shield 4, the collimator 5, the collimator driving unit 6, and the absorber 7 are retained inside the housing 2.

The collimator 5 limits a measuring range of a fuel assembly 1. The collimator also limits entry of gamma rays from the fuel assembly 1 into the gamma-ray detector 3. Longitudinal and vertical positions of the collimator 5 can be varied by using the collimator driving unit 6. The absorber 7 controls intensity of the gamma rays entering the gamma-ray detector 3. The gamma-ray detector 3 can be a germanium semiconductor detector or an LaBr3(Ce) scintillation detector.

The shield 4 shields the gamma-ray detector 3. The shield 4 is a double structure including a shield 4A formed from a metal, such as iron or stainless steel, that is disposed directly on an outer surface of the gamma-ray detector 3, and a shield 4B formed from lead forming an outer surface of the shield 4A. The shield 4A is provided to shield against characteristic X-rays generated when a heavy metal is irradiated with the gamma rays.

The fuel assembly 1 has a shape of a quadrangular pillar, with its overall length being about 4 m, for example. The fuel assembly 1 is placed underwater at a water depth of at least 3 m. The moving and fixing mechanism 11 moves the housing 2 and then fixes the housing to a definite position. The moving and fixing mechanism 11 fixes the housing 2 to, for example, a position that is 7 m deep underwater. The fuel assembly moving and rotating unit 8 rotates the fuel assembly 1 and moves the assembly vertically as well. The fuel assembly moving and rotating unit 8 moves an upper end of the fuel assembly 1 vertically to depths of 3-7 m underwater. The gamma-ray counting circuit 9 measures gamma-ray intensity using a detection signal received from the gamma-ray detector 3.

Next, a manner in which the fuel assembly moving and rotating unit 8 in the gamma scanning apparatus of the present embodiment moves the fuel assembly 1 is described below with reference to FIG. 2.

Figure 2:
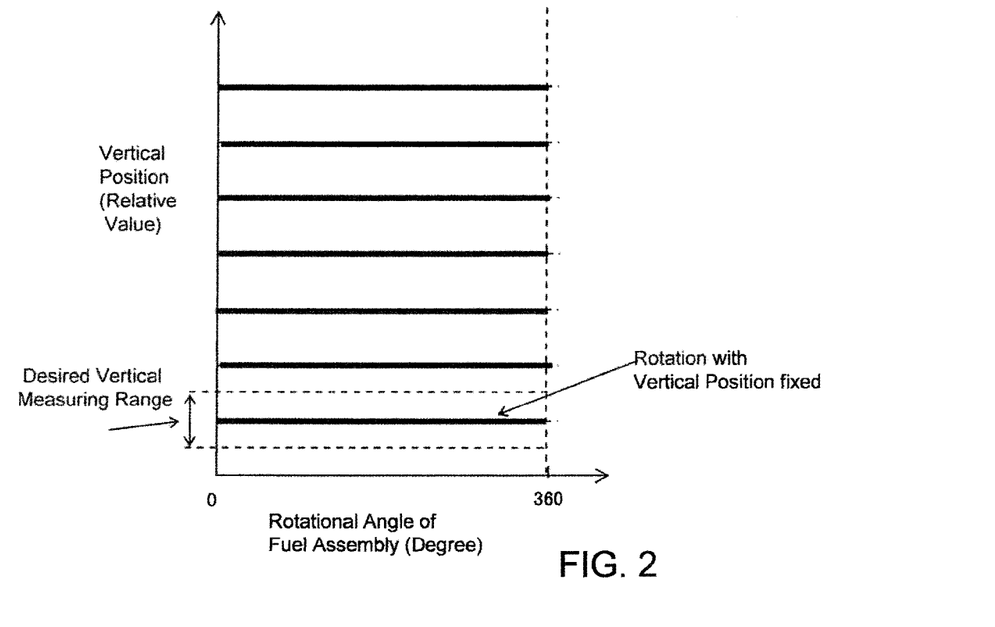
FIG. 2 is an explanatory diagram of an example in which the gamma scanning apparatus according to the embodiment moves a fuel assembly using a fuel assembly moving and rotating unit.

FIG. 2 is an explanatory diagram of an example in which the fuel assembly moving and rotating unit in the gamma scanning apparatus of the present embodiment moves the fuel assembly.

The fuel assembly moving and rotating unit 8, after fixing the fuel assembly 1 to a vertical position, rotates the fuel assembly 1 through 360 degrees with its height kept constant, at a fixed or variable angular velocity. At this time, the fuel assembly moving and rotating unit 8 outputs information on the height, to the data collecting/analyzing and controlling apparatus 10. While rotating the fuel assembly 1, the fuel assembly moving and rotating unit 8 also outputs information on the rotational angle, to the data collecting/analyzing and controlling apparatus 10. During this time, the gamma-ray counting circuit 9 uses the detection signal from the gamma-ray detector 3 to measure a time average of any count values which have been detected during the rotation of the fuel assembly (i.e., an average counting rate), or measure an integral value of any counts detected within a fixed time.

After the measurement at the rotational angle of 360 degrees, the fuel assembly moving and rotating unit 8 moves the fuel assembly 1 to an appropriate position in the vertical direction according to desired measuring height.

After the movement, the fuel assembly moving and rotating unit 8 once again fixes the fuel assembly 1 to that vertical position (height) and then rotates the fuel assembly 1 through 360 degrees with the height kept constant, at a fixed or variable angular velocity. During this time, the gamma-ray counting circuit 9 uses a new detection signal received from the gamma-ray detector 3, to measure a time average of any count values which have been detected during the rotation of the fuel assembly (i.e., an average counting rate), or measure an integral value of any counts detected within a fixed time.

Thus, during the rotation and vertical movement of the fuel assembly 1, data on rotational and vertical positions of the fuel assembly 1 existing at the moving time of day is output from the fuel assembly moving and rotating unit 8 to the data collecting/analyzing and controlling apparatus 10. Data on counting rates of the gamma-ray detector 3 existing at the particular time is also collected at the same time, whereby counting rate data with respect to the rotational and vertical positions of the fuel assembly 1 is then collected. The data collecting/analyzing and controlling apparatus 10 uses the counting rate data to derive burn-up or a power distribution of the fuel assembly 1.

After measurement at an rotational angle of 180 degrees, the fuel assembly 1 may be moved vertically for further measurement.

The vertical burn-up or power distribution of the fuel assembly is measured by the repetition of the above measuring process.

An example of measuring a counting rate of the gamma-ray detector in the gamma scanning apparatus according to the present embodiment is described below with reference to FIG. 3.

Figure 3:
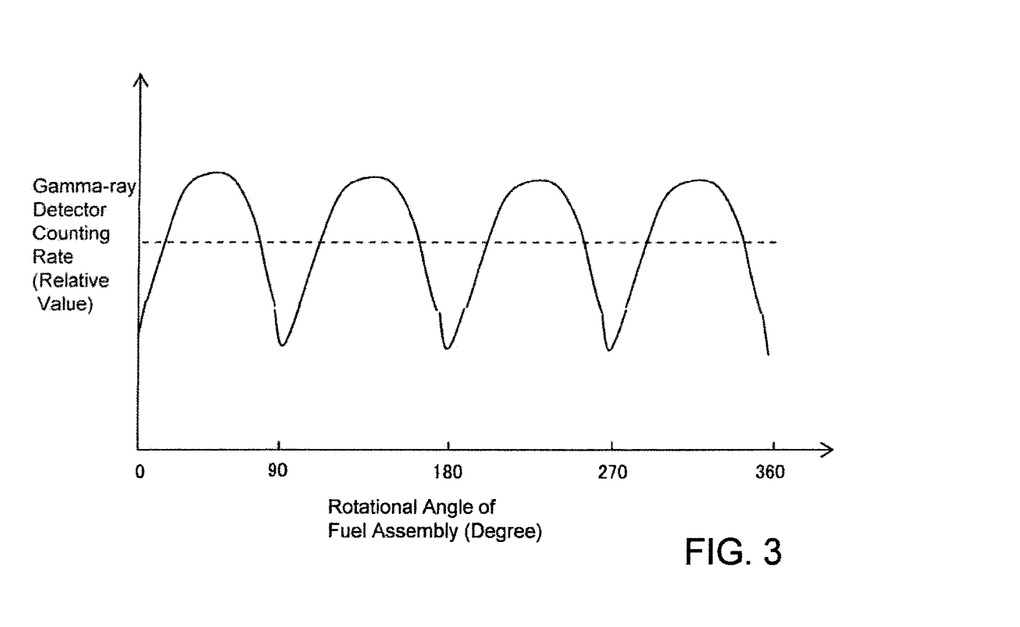
FIG. 3 is an explanatory diagram of an example in which the gamma scanning apparatus according to the embodiment measures a counting rate of a gamma-ray detector.

FIG. 3 is an explanatory diagram of the example in which the gamma scanning apparatus according to the present embodiment measures a counting rate of the gamma-ray detector.

FIG. 3 shows the example of measuring a counting rate of the gamma-ray detector 3 for a rotational angle of the fuel assembly 1. Since internal fuel rods of the fuel assembly 1 also serve as a shield against the gamma rays, a gamma-ray counting rate periodically changes according to rotational angle, as shown in FIG. 3. The fuel assembly has a square cross section, so an angle at which one side of the square faces the detector is taken as 0 degrees.

Under these conditions, in conventional technology, measurements have been conducted with installation angles of the gamma-ray detector and fuel assembly fixed at, for example, 45 degrees (to obtain a high counting rate) and 225 degrees (by further 180-degree rotation from the 45-degree angle position). In this case, an error dependent upon the installation angle has occurred. In the present embodiment, however, measuring accuracy improves since measurement not dependent upon the installation angle is possible by using the time average of the count values detected during rotation (i.e., an average counting rate), or using the integral value of the counts detected within a fixed time.

An example of a method of moving the collimator in the gamma scanning apparatus housing according to the present embodiment is described below with reference to FIGS. 4A to 4C.

4A to 4C are the explanatory diagrams of the example in which the gamma scanning apparatus according to the present embodiment moves the collimator in the housing.

Figure 4A:
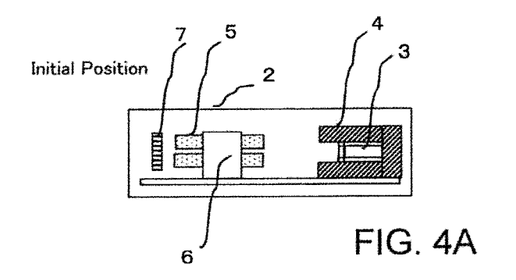
FIGS. 4A to 4C are explanatory diagrams of an example in which the gamma scanning apparatus according to the embodiment moves a collimator in a housing
Figure 4B:
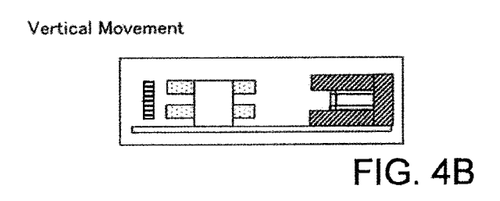
Figure 4C:
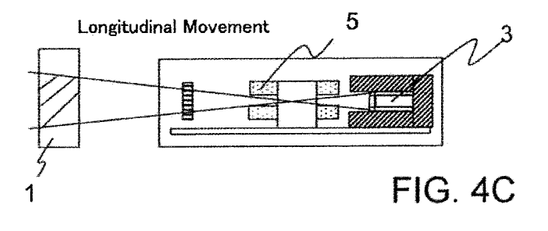

FIG. 4A shows an initial position of the collimator 5 inside the housing 2. The collimator driving unit 6 can vary a vertical position of the collimator 5, as shown in FIG. 4B. The collimator driving unit 6 can also move the collimator 5 in a longitudinal direction of the collimator, as shown in FIG. 4C. Hence a solid angle at which the fuel assembly 1 is viewed from the detector 3 can be varied and the measuring range in the fuel assembly 1 and the intensity of the gamma rays therefrom can be controlled.

The solid angle is described below with reference to FIG. 4C. Lines in this figure that extend from the detector 3 through the collimator 5 to the fuel assembly 1 denote the solid angle at which the fuel assembly 1 is viewed from the detector 3. As shown in FIG. 4B, the solid angle decreases as the collimator 5 moves close to the fuel assembly 1 from the state of FIG. 4C. As shown in FIG. 4A, the solid angle further decreases as a distance across the vertical section of the collimator 5 is narrowed by vertical movement of the collimator from the state of FIG. 4B.

Next, an example of pulse height spectra of the gamma-ray detector in the gamma scanning apparatus of the present embodiment is described below with reference to FIG. 5.

Figure 5:
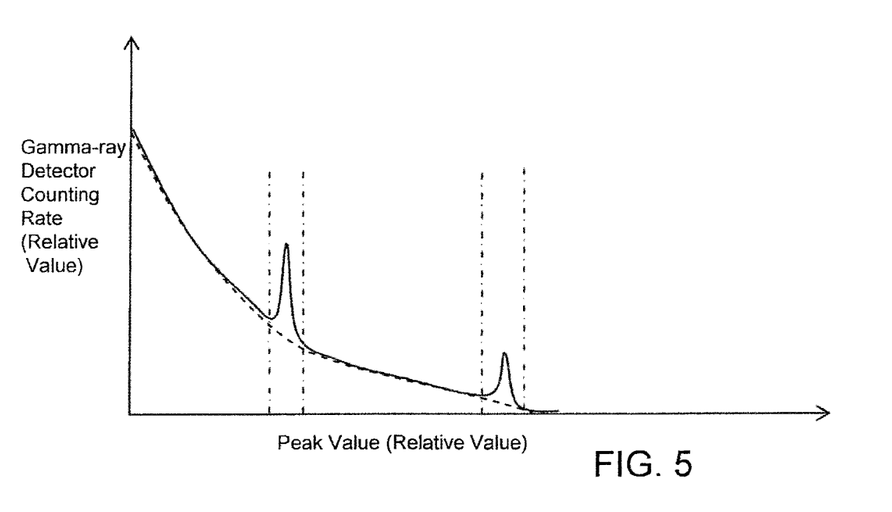
FIG. 5 is an explanatory diagram of an example of pulse height spectra of the gamma-ray detector in the gamma scanning apparatus of the present embodiment.

FIG. 5 is an explanatory diagram of the example of the pulse height spectra of the gamma-ray detector in the gamma scanning apparatus of the present embodiment.

FIG. 5 shows the example of the pulse height spectra of the gamma-ray detector 3. Either a time average of any count values detected during rotation of a burn-up or power distribution index nuclide (i.e., an average counting rate), or an integral value of any counts detected during the rotation within a fixed time is used to derive the burn-up or power distribution.

Caesium-137 or caesium-134 is available as an example of a burn-up index nuclide. Barium-140 and lanthanum-140, zirconium-95 and niobium-95, ruthenium-106 and rhodium-106, or the like are available as examples of a power distribution index nuclide.

The average counting rate or the integral value of the counts within a fixed time, with respect to the index nuclide, may be derived using counts in a peak area of the index nuclide in gamma-ray spectra or using counts within a certain data range corresponding to energy of the gamma rays released from the index nuclide.

As described above, according to the present embodiment, in gamma scanning apparatus that measures the radiation emitted from a fuel assembly at a nuclear power plant and thus measures burn-up and a power distribution of the fuel assembly, the burn-up and the power distribution can be accurately measured not depend on the accuracy of an installation angle of the fuel assembly. Radiation from a number of fuel assemblies can also be measured within a short time.

Next, a gamma scanning apparatus configuration according to another embodiment of the present invention is described below with reference to FIG. 6. An overall configuration of the gamma scanning apparatus according to the present embodiment is substantially the same as the configuration shown in FIG. 1.

Figure 6:
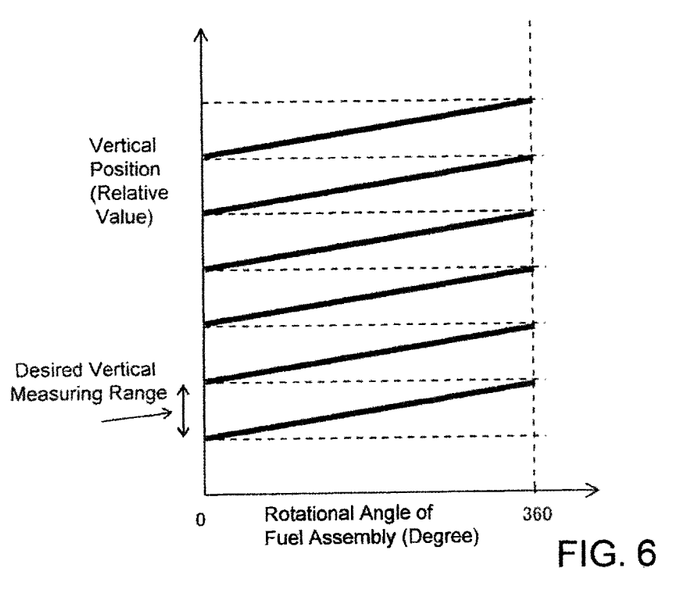
FIG. 6 is an operational explanatory diagram of gamma scanning apparatus according to another embodiment of the present invention.

FIG. 6 is an operational explanatory diagram of the gamma scanning apparatus according to the present embodiment.

After the housing moving and fixing unit 11 has moved the housing 2 and fixed it to a definite position, the fuel assembly moving and fixing unit 8 simultaneously conducts the rotation of the fuel assembly 1 at a fixed or variable angular velocity and the vertical movement of the fuel assembly at a fixed or variable speed. While the fuel assembly 1 rotates through 360 degrees, the fuel assembly moving and fixing unit 8 moves the fuel assembly vertically to the appropriate position according to desired measuring height. During this time, the gamma-ray counting circuit 9 uses the detection signal from the gamma-ray detector 3 to measure either the time average of the counts detected during the rotation (i.e., the average counting rate), or the integral value of the counts detected within a fixed time. The burn-up or power distribution of the fuel assembly is thus derived.

In the above example, the fuel assembly is moved vertically according to the desired measuring height while being rotated through 360 degrees, but the fuel assembly can also be moved vertically according to the desired measuring height while being rotated through 180 degrees.

In the present embodiment, there is no need to fix the fuel assembly for each measuring operation at one vertical position, and the measuring time required can therefore be shortened.

Next, a gamma scanning apparatus configuration according to yet another embodiment of the present invention is described below with reference to FIG. 7.

Figure 7:
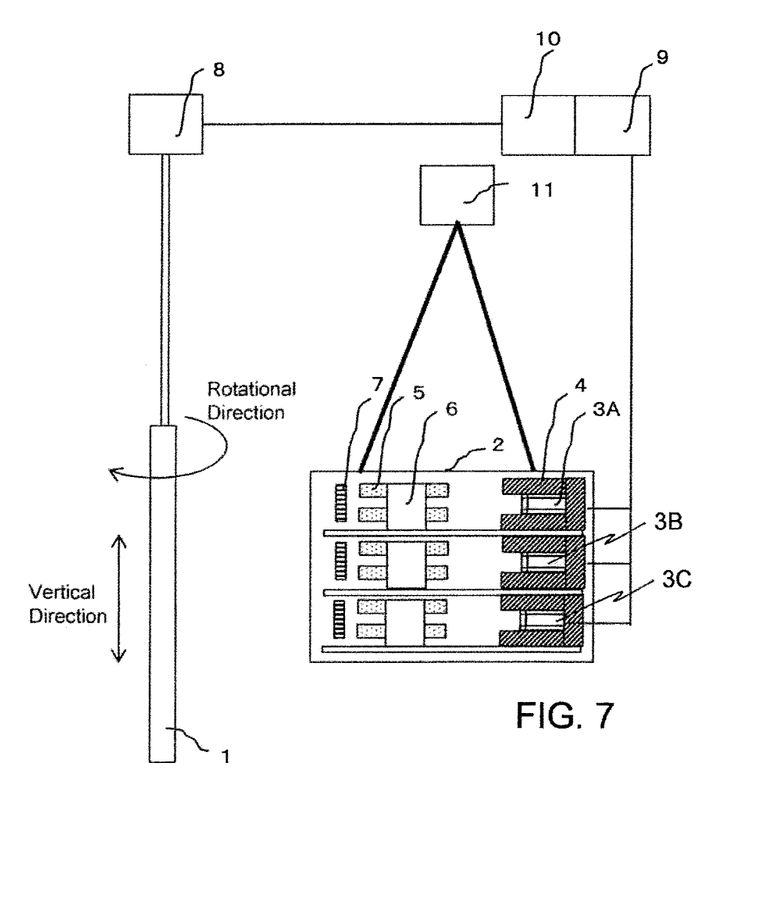
FIG. 7 is a block diagram that shows gamma scanning apparatus configuration according to yet another embodiment of the present invention.

FIG. 7 is a block diagram showing the gamma scanning apparatus configuration according to the present embodiment. The same reference numbers as used in FIG. 1 denote the same elements.

In the present embodiment, a plurality of gamma-ray detectors 3A, 3B and 3C are arranged in the vertical direction and height of each detector is controlled to match desired measuring height or an integral multiple of the desired measuring height.

The vertical layout of the gamma-ray detectors allows reduction in the number of vertical fuel-assembly moving and fixing operations after fixing, and hence, reduction in the measuring time required.

When fuel assembly rotation at a fixed or variable angular velocity and vertical movement of the fuel assembly at a fixed or variable speed are conducted at the same time, although the layout of the plurality of gamma-ray detectors does not lead to shortening the measuring time, measurement results can be verified since the measurement at the same vertical position (height) can be repeated a plurality of times.

What is claimed is:

1. Gamma scanning apparatus comprising:
   a gamma-ray detector;
   a collimator that limits a measuring range in a fuel assembly and limits entry of gamma rays from the fuel assembly into the gamma-ray detector;
   an absorber that controls intensity of the gamma rays entering the gamma-ray detector;
   a shield that shields the gamma-ray detector;
   a housing that contains the gamma-ray detector, the collimator, the absorber, and the shield;
   moving and fixing means that moves the housing to a definite position and fixing the housing thereto;
   rotating and moving means that moves the fuel assembly vertically in addition to rotating the assembly;
   a gamma-ray counting circuit that measures an output of the gamma-ray detector; and
   data collecting/analyzing and controlling apparatus that analyzes data output from the gamma-ray counting circuit, in association with data relating to the rotation and movement of the fuel assembly by the rotating and moving means;
   wherein:
   the rotating and moving means, after fixing the vertical position of the fuel assembly with that of the housing, rotates the fuel assembly through 360 degrees with its height kept constant, at a fixed or variable angular velocity;
   during the 360-degree rotation of the fuel assembly, the gamma-ray counting circuit measures either a time average of any count values which the gamma-ray detector has detected during the rotation of the fuel assembly (i.e., an average counting rate), or an integral value of any counts detected within a fixed time by the detector; and
   the data collecting/analyzing and controlling apparatus analyzes the data output from the gamma-ray counting circuit, in association with the data relating to the rotation and movement of the fuel assembly by the rotating and moving means, and thus derives a burn-up distribution and power distribution of the fuel assembly.

2. The gamma scanning apparatus according to claim 1, wherein:
   the gamma-ray detector is disposed in plurality in a vertical direction and the detectors are each installed at desired measuring height in the vertical direction or at an integral multiple of the desired measuring height.

3. The gamma scanning apparatus according to claim 1, wherein:
   during the rotation and vertical movement of the fuel assembly, the data collecting/analyzing and controlling apparatus simultaneously collects data on rotational and vertical positions of the fuel assembly existing at particular moving time of day, and data on counting rates of the gamma-ray detector existing at the particular time.

4. The gamma scanning apparatus according to claim 1, wherein:
   the burn-up or power distribution of the fuel assembly is derived by using an average counting rate with respect to a burn-up index nuclide or power index nuclide or using an integral value of any count values detected within a fixed time.

5. The gamma scanning apparatus according to claim 1, wherein:
   a germanium semiconductor detector or an LaBr3 (Ce) scintillation detector is used as the gamma-ray detector.

6. The gamma scanning apparatus according to claim 1, further comprising:

collimator driving means that drives a collimator, the collimator being disposed in the gamma scanning apparatus, so as to make height of the collimator variable and to render a distance between the fuel assembly and the detector variable;

wherein the collimator driving means makes variable a solid angle at which the fuel assembly is viewed from the detector.

7. The gamma scanning apparatus according to claim 1, wherein:

the shield includes iron, stainless steel, or any other metallic equivalent, which is placed around the gamma-ray detector in order to shield against characteristic X-rays generated when a heavy metal is irradiated with the gamma rays.

8. Gamma scanning apparatus comprising:

a gamma-ray detector;

a collimator that limits a measuring range in a fuel assembly and limits entry of gamma rays from the fuel assembly into the gamma-ray detector;

an absorber that controls intensity of the gamma rays entering the gamma-ray detector;

a shield that shields the gamma-ray detector;

a housing that contains the gamma-ray detector, the collimator, the absorber, and the shield;

moving and fixing means that moves the housing to a definite position and fixing the housing thereto;

rotating and moving means that moves the fuel assembly vertically in addition to rotating the assembly;

a gamma-ray counting circuit that measures an output of the gamma-ray detector; and data collecting/analyzing and controlling apparatus that analyzes data output from the gamma-ray counting circuit, in association with data relating to the rotation and movement of the fuel assembly by the rotating and moving means;

wherein:

after fixing the housing, the rotating and moving means simultaneously conducts the rotation and vertical movement of the fuel assembly, and during 360-degree rotation, moves the fuel assembly vertically to an appropriate position according to desired measuring height;

during the 360-degree rotation, the gamma-ray counting circuit measures either the time average of the count values which have been detected during the rotation and vertical movement of the fuel assembly (i.e., the average counting rate), or the integral value of the counts detected within a fixed time by the detector, and thus derives the burn-up and power distribution of the fuel assembly; and the data collecting/analyzing and controlling apparatus analyzes the data output from the gamma-ray counting circuit, in association with the data relating to the rotation and movement of the fuel assembly by the rotating and moving means, and thus derives a burn-up distribution and power distribution of the fuel assembly.

9. Gamma scanning apparatus comprising:

a gamma-ray detector;

a collimator that limits a measuring range in a fuel assembly and limits entry of gamma rays from the fuel assembly into the gamma-ray detector;

an absorber that controls intensity of the gamma rays entering the gamma-ray detector;

a shield that shields the gamma-ray detector;

a housing that contains the gamma-ray detector, the collimator, the absorber, and the shield;

moving and fixing means that moves the housing to a definite position and fixing the housing thereto;

rotating and moving means that moves the fuel assembly vertically in addition to rotating the assembly;

a gamma-ray counting circuit that measures an output of the gamma-ray detector; and data collecting/analyzing and controlling apparatus that analyzes data output from the gamma-ray counting circuit, in association with data relating to the rotation and movement of the fuel assembly by the rotating and moving means;

wherein:

after fixing the housing, the rotating and moving means simultaneously conducts the rotation and vertical movement of the fuel assembly, and during 180-degree rotation, moves the fuel assembly vertically to an appropriate position according to desired measuring height;

during the 180-degree rotation, the gamma-ray counting circuit measures either a time average of any count values which have been detected during the rotation and vertical movement of the fuel assembly (i.e., an average counting rate), or an integral value of any counts detected within a fixed time by the detector, and thus derives a burn-up and power distribution of the fuel assembly; and the data collecting/analyzing and controlling apparatus analyzes the data output from the gamma-ray counting circuit, in association with the data relating to the rotation and movement of the fuel assembly by the rotating and moving means, and thus derives a burn-up distribution and power distribution of the fuel assembly.

* * * * *